(12) United States Patent
Carillo (10) Patent No.: US 7,722,231 B2
(45) Date of Patent: May 25, 2010

(54) BICYCLE SAFETY LIGHTING

(76) Inventor: James Carillo, 277 St. Joseph Ave., Long Beach, CA (US) 90803

( * ) Notice: Subject to any disclaimer, the term of this patent is extended or adjusted under 35 U.S.C. 154(b) by 408 days.

(21) Appl. No.: 11/810,604

(22) Filed: Jun. 6, 2007

(65) Prior Publication Data
US 2007/0285934 A1 Dec. 13, 2007

Related U.S. Application Data (60) Provisional application No. 60/812,056, filed on Jun. 8, 2006.

(51) Int. Cl.
*B62J 6/00* (2006.01)
(52) U.S. Cl. .................. 362/473; 362/476; 362/483; 362/500; 280/288.4; 280/301
(58) Field of Classification Search .................. 362/473, 362/476, 483, 500; 280/288.4, 301; 340/432
See application file for complete search history.

(56) References Cited

U.S. PATENT DOCUMENTS

| | | | |
|---|---|---|---|
| 3,696,334 A | 10/1972 | Demeter | |
| 4,049,959 A | 9/1977 | Ledterman | |
| 4,085,317 A | 4/1978 | Mithoff | |
| 4,204,191 A * | 5/1980 | Daniels | ....................... 340/432 |
| 4,309,741 A | 1/1982 | Smith | |
| 4,577,261 A * | 3/1986 | Tsuyama | ..................... 362/473 |
| 4,623,954 A | 11/1986 | Schott et al. | |
| 5,040,099 A | 8/1991 | Harris | |
| 5,072,339 A | 12/1991 | Shimojo | |
| 5,197,795 A * | 3/1993 | Mudrovich | .................. 362/473 |
| 5,276,593 A * | 1/1994 | Lighthill et al. | .............. 362/473 |
| 5,920,643 A * | 7/1999 | White et al. | ................. 382/141 |
| 6,158,881 A | 12/2000 | Carne | |
| 6,759,947 B2 * | 7/2004 | Aceves | ........................ 340/432 |
| 2002/0093825 A1 * | 7/2002 | Bailey | ......................... 362/473 |
| 2002/0163817 A1 * | 11/2002 | Bukowsky | ................... 362/500 |
| 2006/0158890 A1 * | 7/2006 | Freedman | .................... 362/390 |

* cited by examiner

*Primary Examiner*—Sandra L O'Shea
*Assistant Examiner*—Mary Zettl
(74) *Attorney, Agent, or Firm*—Kenneth L. Green (57) ABSTRACT

A bicycle or moped lighting system projects light onto a rider's legs to make the rider more visible to motor vehicle operators and thereby improve the rider's safety. At least one safety light fixture is mounted to lower portions of bicycle seat stays or rear portions of the bicycle chain stays. The light fixture includes light sources generating light beams directed forward onto rear surfaces of the rider's legs. While peddling, the motion of the lighted legs attracts the attention of the motor vehicle operators thereby improving rider visibility. Additional light beams may be directed inward and upward toward the bicycle frame and/or the rider's buttocks to provide additional visibility to the rider and to allow the motor vehicle operators to more easily identify the bicycle and rider. A second light fixture may reside ahead of the rider to direct light beams onto the front of the rider's moving legs.

20 Claims, 12 Drawing Sheets

BICYCLE SAFETY LIGHTING

The present application claims the benefit of U.S. Provisional Application Ser. No. 60/812,056, filed Jun. 8, 2006, which application is incorporated herein by reference.

BACKGROUND OF THE INVENTION

The present invention relates to bicycle safety and in particular to bicycle safety lighting.

Bicycle riding has been both a form of transportation and recreation for many years and in many parts of the world. When such riding occurs in low light and/or dark conditions the safety of the rider depends upon the rider's ability to see the road surface ahead and more importantly being able to be seen by motor vehicle operators using the road. This invention addresses the safety need to be seen by motor vehicle operators.

Various safety devices, generally comprising reflectors and/or lights, are known and used by bicycle riders. Most bicycles are sold with reflectors, however such reflectors are small and depend on light being directed towards them. Both forward facing and rearward facing lights are also common, and are generally mounted on or near handle bars, or under the bicycle seat. While such lights provide some added visibility to the rider, it is often not sufficiently conspicuous to motor vehicle operators.

Several attempts have been made to provide an elevated lighting for bicycles based on the belief that a higher light is more visible. Such elevated devices are described in U.S. Pat. Nos. 4,049,959, and 4,309,741. Unfortunately, while these are intuitively attractive, in practice they have failed to gain acceptance, possibly because of the ungainly appearance, and because they do not provide a significant improvement in visibility compared to existing lights.

Other attempts have been made to provide safety lighting to improve the visibility of motorcycle riders. U.S. Pat. No. 5,072,339 discloses a lighting residing towards the rear of motorcycle seating, which light illuminates a rider's back to improve visibility. Unfortunately, such lighting fails to illuminate an easily identifiable portion of the rider, especially when the rider is leaning forward on the handle bars, and is not likely to cause a motor vehicle operator to immediately identify the rider and provide increased safety.

BRIEF SUMMARY OF THE INVENTION

The present invention addresses the above and other needs by providing a bicycle or moped lighting system which projects light onto a rider's legs to make the rider more visible to motor vehicle operators and thereby improve the rider's safety. At least one safety light fixture is mounted to lower portions of bicycle seat stays or rear portions of the bicycle chain stays. The light fixture includes light sources generating light beams directed forward onto rear surfaces of the rider's legs. While peddling, the motion of the lighted legs attracts the attention of the motor vehicle operators thereby improving rider visibility. Additional light beams may be directed inward and upward toward the bicycle frame and/or the rider's buttocks to provide additional visibility to the rider and to allow the motor vehicle operators to more easily identify the bicycle and rider. A second light fixture may reside ahead of the rider to direct light beams onto the front of the rider's moving legs.

In accordance with one aspect of the invention, there is provided a bicycle and safety lighting system including a bicycle and at least one safety light fixture. The bicycle includes a bicycle frame including a steering head, seat tube, a right seat stay, a left seat stay, a right chain stay, and a left chain stay. A fork is connected to the steering head, a front wheel and tire are rotatably mounted to the fork. A rear axle is attached to the frame proximal to the intersection of the seat stays and the chain stays and a rear wheel and tire are rotatably mounted to the rear axle. A bicycle seat is supported by the seat tube and a remote electrical power source may be carried under the seat and connected to the safety light by cabling, or may be integral with the safety light fixture. The safety light fixture may be attached to one of the seat stays, the chain stays, or the rear axle. At least one Light Emitting Diode (LED) resides on the safety light fixture and generates a forward pointing beam towards the rider's legs. The safety light fixture may also include inward and upward facing LEDs for illuminating the frame and the rear wheel. The safety light fixture may comprise a left safety light fixture and a right safety light fixture attached to the left and right sides of the bicycle respectively using a quick release.

In accordance with another aspect of the invention, there is provided a bicycle and safety lighting system. The bicycle includes a bicycle frame having a steering head, a seat tube, a right seat stay, a left seat stay, a right chain stay, and a left chain stay. A fork is rotatably attached to the steering head and a front wheel and tire are rotatably mounted to the fork. A rear wheel and tire are rotatably mounted to a rear axle attached to the frame proximal to the intersection of the seat stays and the chain stays. A bicycle seat is supported by the seat tube. A safety light fixture is attached to the bicycle below and behind the seat. The safety light fixture includes a light source for generating a forward pointing beam for illuminating a rider's legs. A power source is electrically connected to the light source and may be housed in the safety light fixture or be connected to the light source by cabling. A second safety light fixture may be mounted ahead of the rider to direct a light beam on fronts of the rider's legs.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
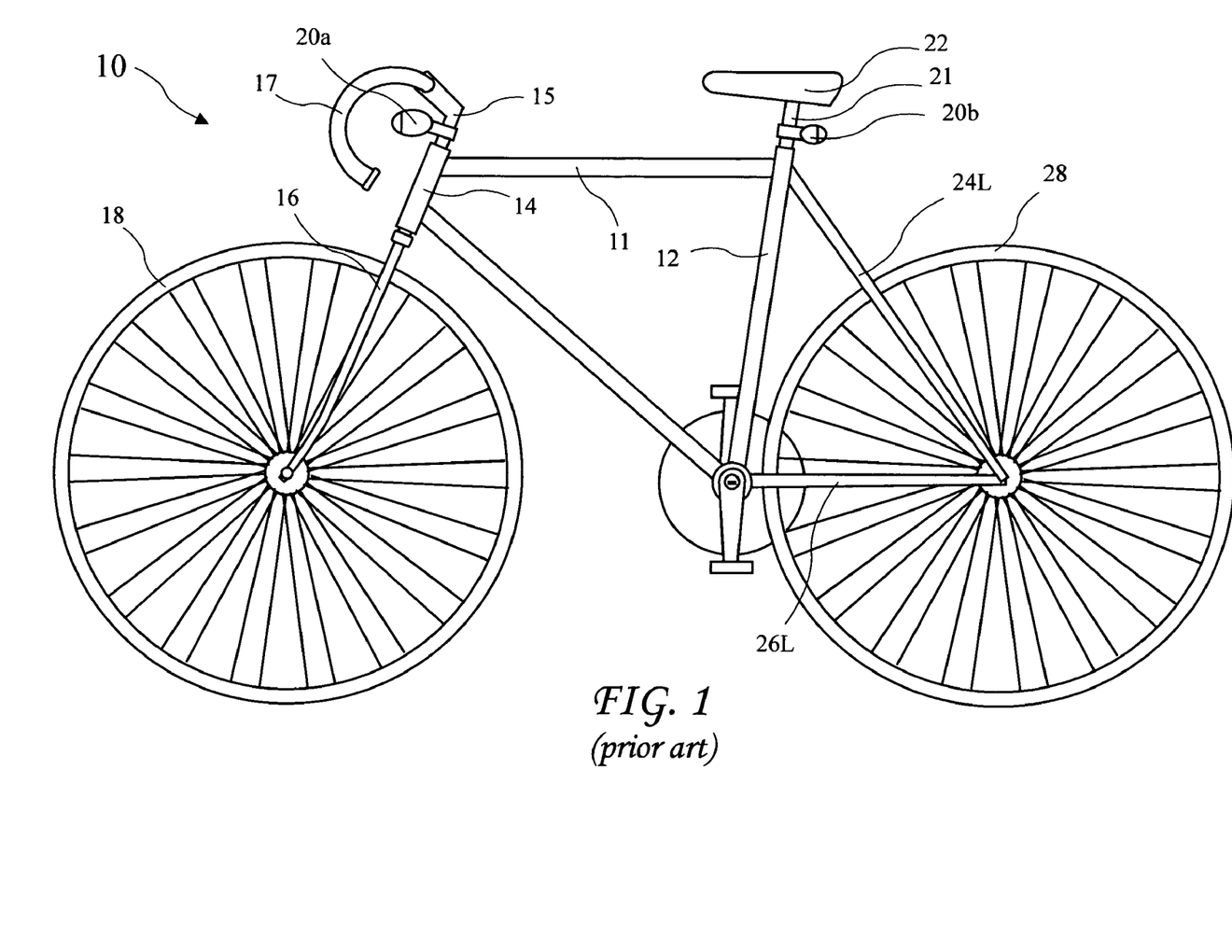
FIG. 1 is a prior art bicycle.

A prior art bicycle 10 is shown in FIG. 1. The bicycle 10 includes a frame including a top tube 11, a seat tube 12, a steering head 14, seat stays 24R, and 24L (see FIGS. 3 and 3A), and chain stays 26R and 26L. A fork 16 is rotatably mounted to the steering head 14, and handlebars 17 are mounted to the fork 16 by a gooseneck 15. A seat 22 is mounted to the seat tube 12 by a seat post 21. A front light 20a is mounted to the gooseneck 15 and a rear light 20b is mounted to the seat post 21. While the front light 20a and rear light 20b provide some visibility to the bicycle 10, motor vehicle operators still often fail to see and identify a bicycle and rider at night and in low light conditions. Further, a common "point like" rear light 20b may provide no indication of distance to motor vehicle operators.

Figure 2:
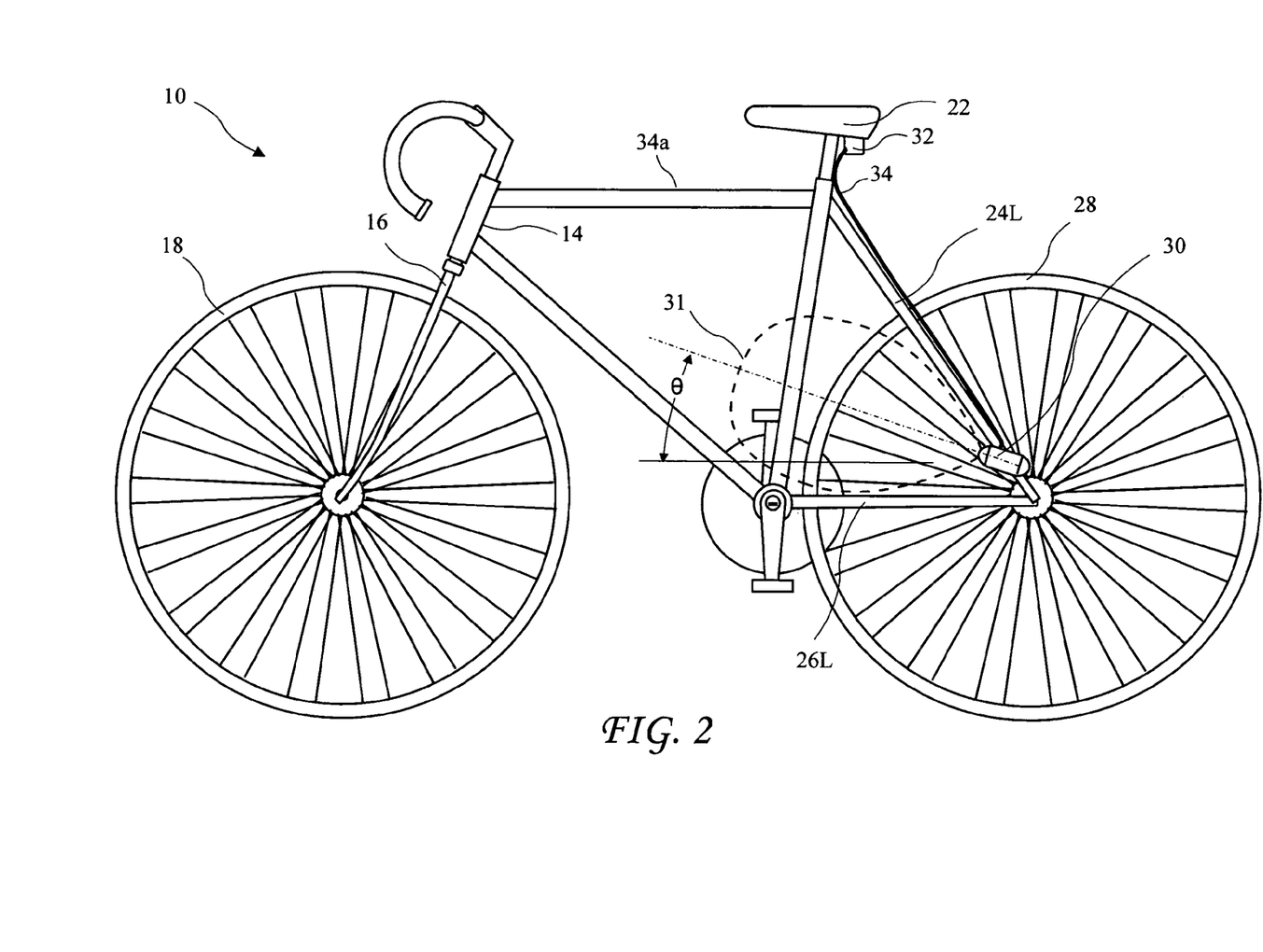
FIG. 2 is a side view of the bicycle and a safety light system with a single beam safety light fixture according to the present invention, attached to a seat stay.

A side view of the bicycle 10 and a safety light system according to the present invention is shown in FIG. 2. The safety lighting system according to the present invention includes a safety light fixture 30 mounted below and preferably behind the seat 22. The safety light fixture 30 includes at least one electrical light source 42 (see FIGS. 4A, 4B, and 5) which produces at least one forward pointing (having an elevation angle $\Theta$ between −90 degrees and +90 degrees) beam 31. The elevation angle $\Theta$ (theta) of the beam 31 is preferably adjusted to maximally illuminate a rider's legs while in pedaling position, and the best elevation angle $\Theta$ is dependent on where the safety light fixture 30 is mounted on the bicycle. The safety light fixture 30 is preferably mounted on a lower portion 25 (see FIG. 3A) of one of the seat stays 24L or 24R and the elevation angle $\Theta$ is preferably between approximately zero degrees and approximately thirty degrees.

While the elevation angle $\Theta$ is preferably between approximately zero degrees and approximately thirty degrees, in some cases the safety light fixture 30 could be mounted under the seat 22 but not behind the seat 22 or even worn by the rider, and in this instance, the elevation angle $\Theta$ may be negative, and any safety light mounted to a bicycle or worn by a rider to illuminate a rider's legs while pedaling, is intended to come within the scope of the present invention.

Figure 3:
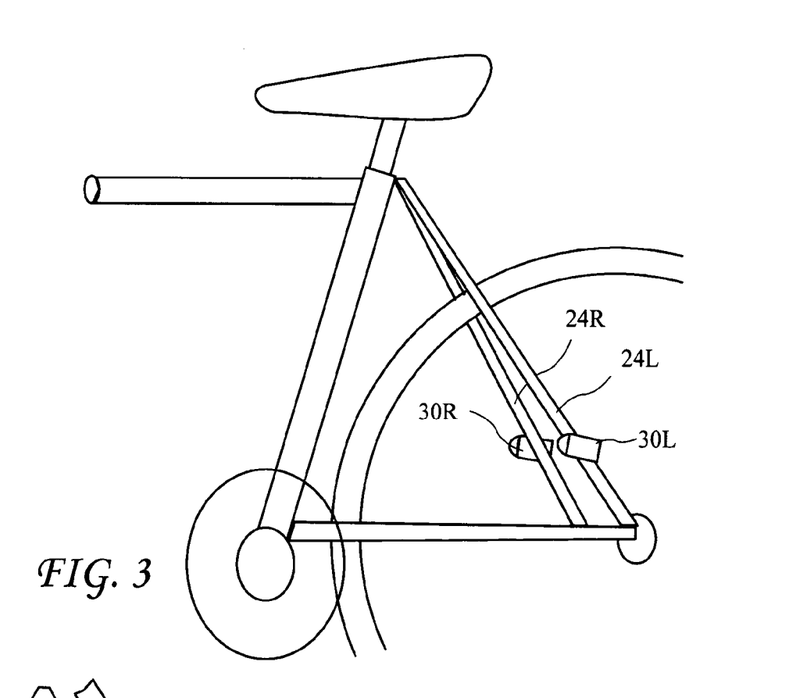
FIG. 3 shows safety light fixtures mounted to a lower portion of seat stays.
Figure 3A:
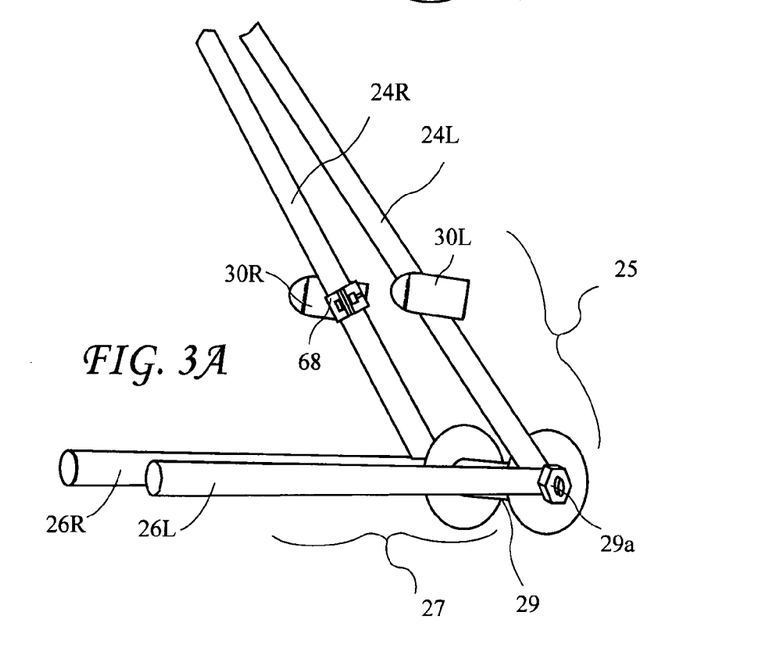
FIG. 3A shows a more detailed view of the safety light fixtures mounted to the lower portion of seat stays.

The safety light fixture 30 may be mounted to either or both sides of the bicycle (see FIGS. 3, 3A). The electrical power source is preferably provided by batteries residing in the safety light fixture 30 (see FIG. 5) but may be any energy storage devices residing in the safety light fixture 30, or a remote electrical power source 32 residing, for example, under the seat 22 with cabling 34 electrically connecting the remote electrical power source 32 to the safety light fixture 30 (see FIG. 2).

Further, the safety light 30 may comprise a left safety light fixture 30L mounted on the left side of the bicycle and a right safety light fixture 30R mounted on the right side of the bicycle (see FIGS. 3 and 3A). The safety light fixture 30L and/or 30R may include batteries (see FIG. 14) or some other electrical power source and the remote electrical power source 32 and cabling 34 may be eliminated. The beam(s) 31 are positioned and pointed for illuminating a rider's legs, which illumination provides significant visibility to the rider at night and in low light conditions. Because the legs are easily recognizable by a motor vehicle operator, the rider is quickly seen and recognized. Further, while peddling, motion of the moving legs further improves visibility.

The safety light fixtures 30R and 30L are shown mounted to the seat stays 24L and 24R in FIG. 3, and a more detailed view of the safety light fixtures 30R and 30L mounted to seat stays 24R and 24L is shown in FIG. 3A. The safety light fixtures 30R and 30L are preferably mounted to a lower portion 25 (see FIG. 3A) of seat stays 24R and 24L, but may alternatively be mounted to a rearward portion 27 of the chain stays 26R and 26L. Each safety light fixture 30R and 30L is preferably attached to the corresponding seat stay 24R and 24L by a mounting band 76 (see FIG. 6). The safety light fixtures 30R and 30L may also be attached by studs welded or otherwise attached to the seat stays 24R and 24L or the chain stays 26R and 26L. The welded studs would be connected to remote power source 32 residing under the seat 22 by cabling routed inside the seat stay. The safety light fixtures 30R and 30L may alternatively be attached by axle nuts 29a to the rear axle 29 or by welded on studs. Further, when welded-on studs are provided, wires may run through the seat stays and exit near the studs to connect to the safety lights. Such welded-on studs may resemble the threaded posts 84 and be surrounded by serrated portions 78 as shown for the bracket 68 and cooperate with the quick release carriage 72 (see FIGS. 6A-7A).

Figure 4A:
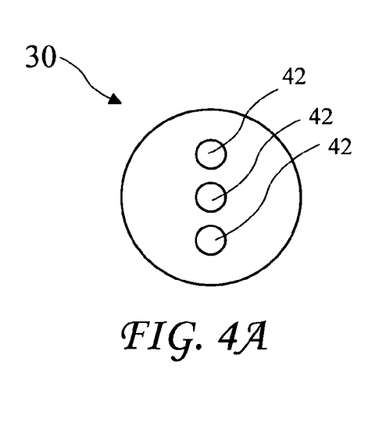
FIG. 4A is a front view of the single beam safety light fixture.
Figure 4B:
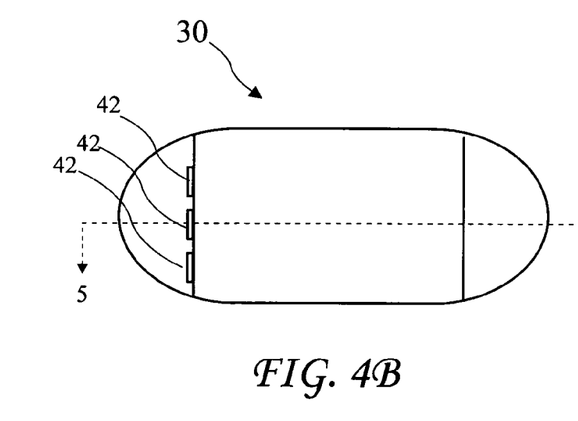
FIG. 4B is a side view of the single beam safety light fixture.
Figure 5:
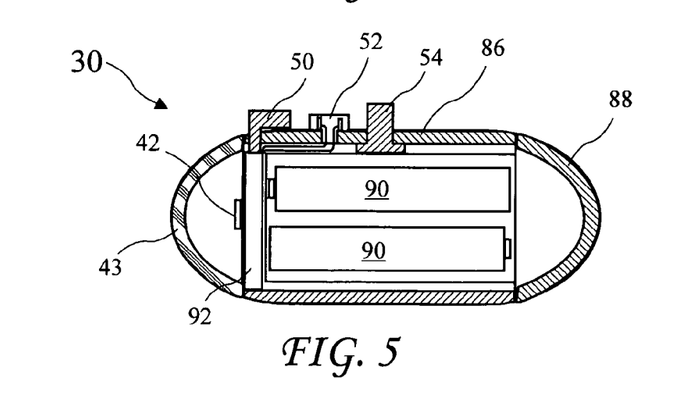
FIG. 5 is a cross-sectional view of the single beam safety light fixture taken along line 5-5 of FIG. 4B.

A front view of the safety light fixture 30 is shown in FIG. 4A, a side view of the safety light fixture 30 is shown in FIG. 4B, and a cross-sectional view of the safety light fixture 30 taken along line 5-5 of FIG. 4B is shown in FIG. 5. The safety light fixture 30 may be used on the right or left side of a bicycle and includes at least one light source 42 for generating the beam 31 (see FIG. 2), and preferably includes at least three light sources 42, and more preferably includes at least five light sources 42. The light sources 42 are covered by a clear lens 43 for protection and are preferably LEDs. A circuit board 92 provides a proper LED power signal and may serve as a heat sink for the light sources 42. A switch 50 is connected to the circuit board 92 and allows a rider to turn the power to the light sources 42 on and off as needed or desired. The safety light fixture is preferably water resistant or water proof. The LEDs preferably have a viewing angle (also called total viewing angle) of between approximately 60 degrees and approximately 90 degrees.

The safety light fixture 30 further includes a housing 86, and a mounting feature 54, for example, a threaded stud or internally threaded post, is attached to the housing 86 or alternatively a slot 70 (see FIGS. 6 and 7) in the housing 86. As an alternative to the remote electrical power source 32, batteries 90 are shown residing inside the housing 86 to provide an electrical power source and a removable cap 88 allows battery replacement (see FIG. 5). A plug 52 may reside on the exterior of the housing 86 for recharging without removing the batteries 90. The safety light fixture is preferably water resistant or water proof.

LEDs are a preferred light source 42 because of the low power requirements of LEDs. The LEDs preferably reside on electrical circuit boards providing power to the LEDs, which also provides heat dissipation for the LEDs. Such heat dissipation is important because overheating shortens the life of an LED. Alternatively, the electrical circuits may reside with the power source 32, or along the cabling 24, and in this instance, a separate heat sink is preferably provided to dissipate heat generated by the LEDs.

Figure 6A:
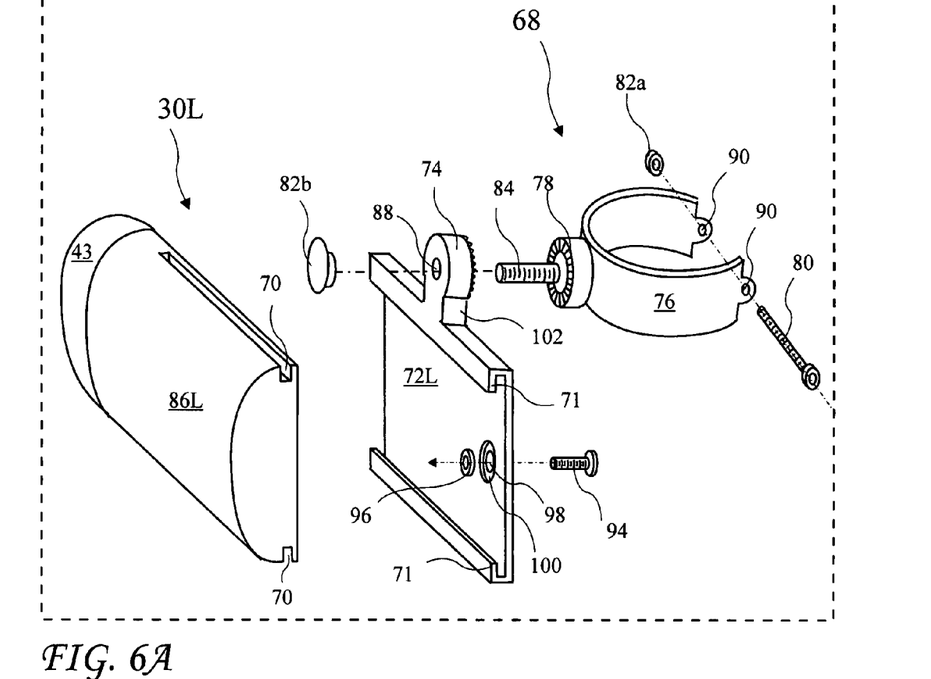
FIG. 6A is a rear/inside perspective view of the left safety light fixture and a mounting apparatus.
Figure 6B:
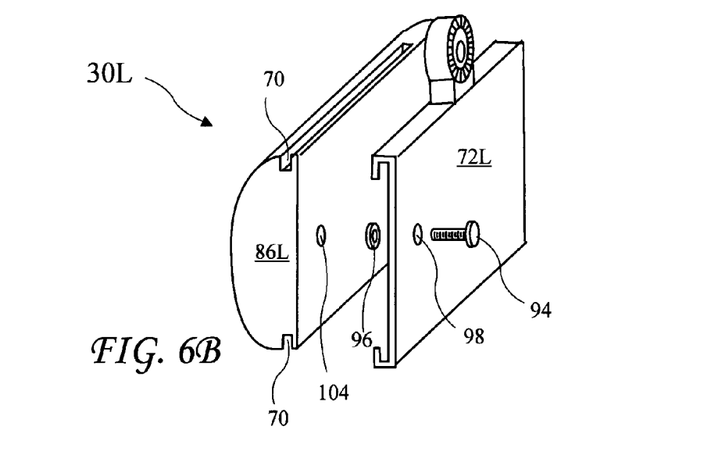
FIG. 6B is a rear/outside perspective view of the left safety light fixture and the mounting apparatus.
Figure 6C:
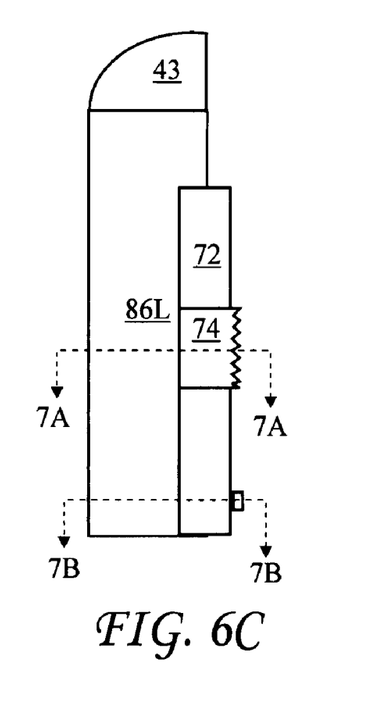
FIG. 6C is a top view of the left safety light fixture and the mounting apparatus.
Figure 7A:
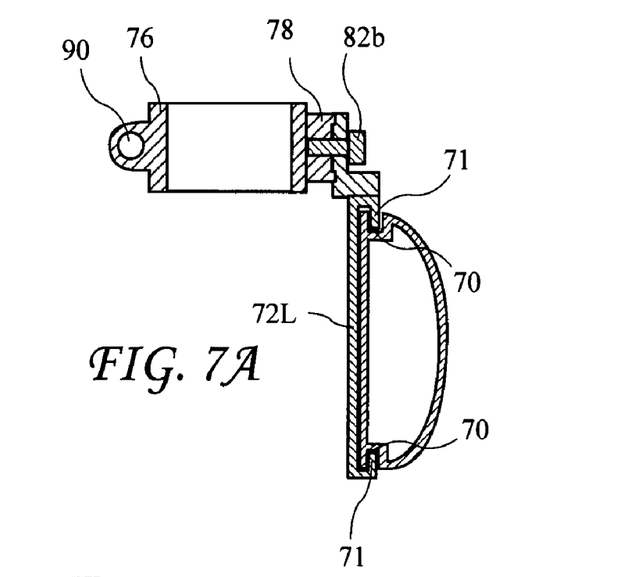
FIG. 7A is a cross-sectional view of the left safety light fixture and the mounting apparatus taken along line 7A-7A of FIG. 6C.
Figure 7B:
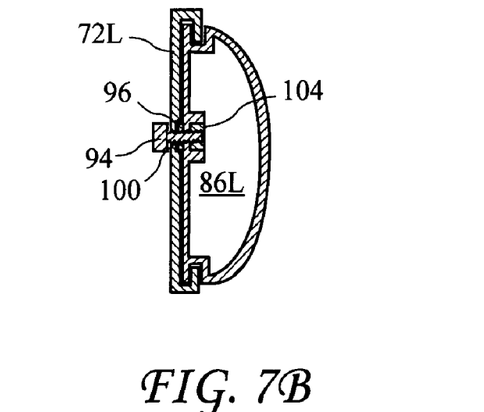
FIG. 7B is a cross-sectional view of the left safety light fixture and the mounting apparatus taken along line 7B-7B of FIG. 6C.

A top rear outside perspective view of a left safety light fixture 30L with a lens 43 covering the LED light sources 42 (not shown) and a quick release bracket mechanism 68 is shown in FIG. 6A, a rear/outside perspective view of the left safety light fixture 30L and the mounting apparatus 68 is shown in FIG. 6B, a top view of the left safety light fixture 30L and the mounting apparatus 68 is shown in FIG. 6C, a cross-sectional view of the left safety light fixture 30L and the mounting apparatus 68 taken along line 7A-7A of FIG. 6C is shown in FIG. 7A, and a cross-sectional view of the left safety light fixture 30L and the mounting apparatus 68 taken along line 7B-7B of FIG. 6C is shown in FIG. 7B. Top and bottom quick release slots 70 of left light fixture 30L are formed in a left housing 86L. A left quick release carriage 72L includes top and bottom rails 71 configured to cooperate with the slots 70 and a serrated attachment ear 74 attached to the top of the quick release carriage 72L by a neck 102. Such arrangement allows the safety light fixture 30L to slide onto the quick release carriage 72L preventing the light from pulling away laterally from the quick release carriage 72L.

The safety light fixture 30L is prevented from sliding forward and backward by a quick release thumb screw 94 passing through a passage 98 in quick release carriage 72L and threaded into a mount nut 104 of the housing 86L. The thumb screw 94 preferably includes a fixing washer 96 which tends to be retained on the thumb screw to prevent the threaded thumb screw 94 from separating from the quick release carriage 72L when the safety light fixture 30L is removed from the quick release carriage 72L. The passage 98 in the quick release carriage 72L includes a countersink hole 100 on the safety light fixture 30L side of quick release carriage 72L to accommodate the washer 96 and the end of the quick release thumb screw 94 and not interfere with the safety light fixture 30L as the safety light fixture 30L slides on the quick release carriage 72L.

The thumb screw 94 passes through the passage 98 and threads into a mounted nut 104 of the housing 86L. The counter sunk depression 100 in the quick release carriage 72L provides space for the washer 96 and the end of the quick release thumb screw 94 to allow the safety light fixture 30L to slide into the quick release carriage 72L without releasing the thumb screw 94 from the release carriage 72L. A mounting band 76 clamps around the seat stay 24a or 24b (see FIGS. 3 and 3A) and is held in place by a threaded bolt 80 passing through the passages 90 in mounting band 76 and retained by a first threaded fastener 82a. The threaded bolt 80 is preferably a thumb screw to allow quick attachment and detachment without requiring a tool. A threaded post 84 reaches laterally from the mounting band 76 and passes through the ear 74 of the quick release carriage 72L, and held in place by a second threaded fastener 82b, preferably a finger tighenable nut. The mounting band 76 includes a serrated element 78 which cooperates with the serrated surface on the ear 74 of the quick release carriage 72L to fix the elevation angle θ of the safety light fixture 30L to maintain a maximal illumination of the legs of the rider. The quick release allows the safety light fixture 30L to slide on and off the quick release strut 72L so that safety light fixture 30L may be removed to prevent theft when the bicycle is left unattended.

The right safety light fixture 30R (see FIGS. 3 and 3A) is preferably the mirror image of the left safety light fixture 30L.

Figure 8A:
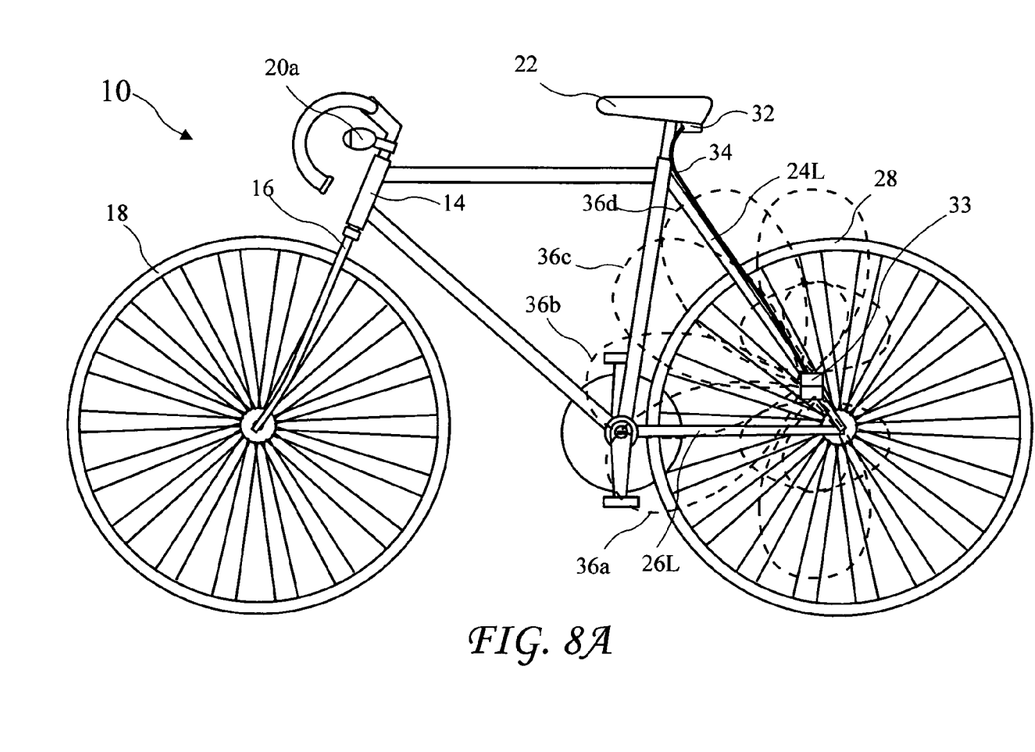
FIG. 8A is a side view of the bicycle and a second embodiment of the safety light system according to the present invention.
Figure 8B:
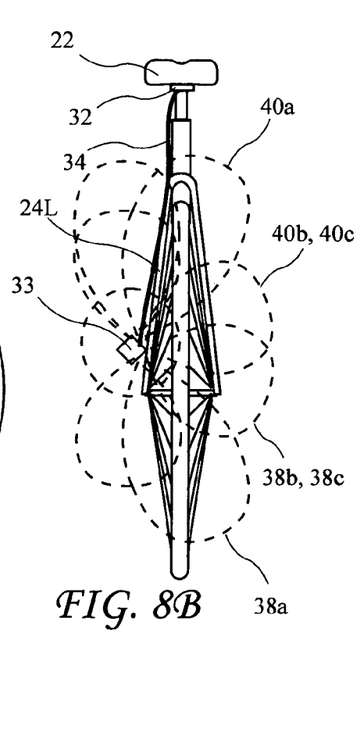
FIG. 8B is a rear view of the bicycle and the second embodiment of the safety light system according to the present invention.

A side view of the bicycle 10 and a second safety light fixture 33 according to the present invention is shown in FIG. 8A and a rear view of the bicycle 10 and safety light fixture 33 is shown in FIG. 8B. The safety light fixture 33 includes a multiplicity of electrical light sources 42 and preferably produces a plurality of forward beams 36a-36d and inward beams 38a-38c and 40a-40c. All of the beams are shown in FIGS. 8A and 8B, with the forward beams 36a-36d labeled in FIG. 8A, and the inward beams 38a-38c and 40a-40c labeled in FIG. 8B. Beams are shown for a left safety light fixture 33L and beams from a right safety light fixture 33R are the mirror image of the beams from the light 33L.

Figure 9A:
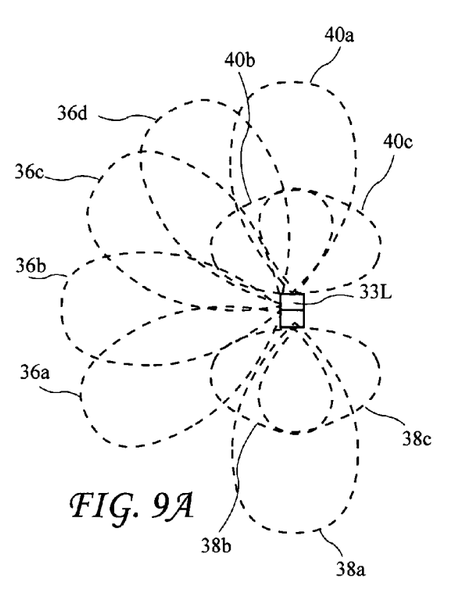
FIG. 9A shows a side view of forward and inward beams of the left safety light.
Figure 9B:
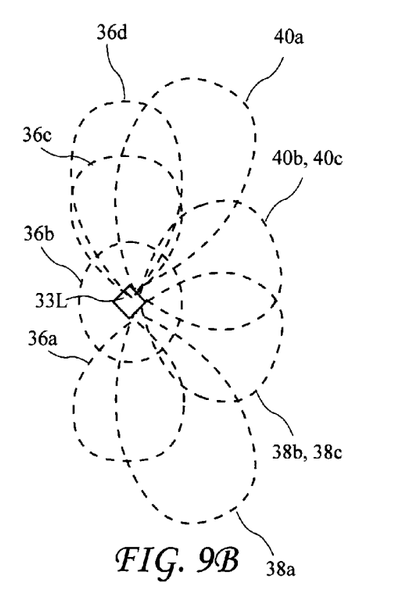
FIG. 9B shows a rear view of the forward and the inward beams of the left safety light.
Figure 9C:
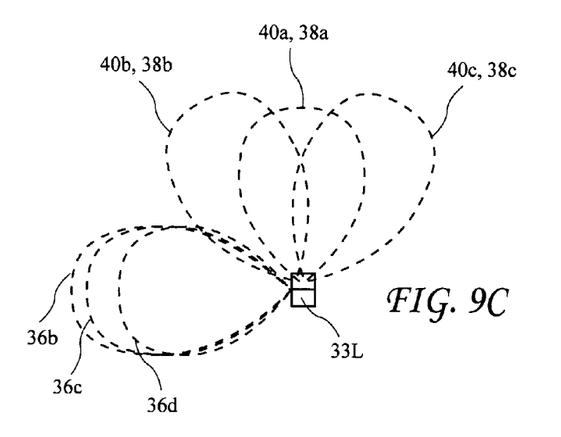
FIG. 9C shows a top view of the forward and the inward beams of the left safety light.

A side view of the forward beams 36a-36d and inward beams 38a-38c and 40a-40c of the left safety light 33 is shown in FIG. 9A, a rear view of the forward beams 36a-36d and the inward beams 38a-38c and 40a-40c of the left safety light fixture 33 is shown in FIG. 9B, and a top view of the forward beams 36a-36d and the inward beams 38a-38c and 40a-40c of the left safety light 33 is shown in FIG. 9C. The forward beams 36a-36d primarily illuminate the rider's legs and the inward beams 38a-38c and 40a-40c further illuminate the frame and rear wheel and tire.

Figures 10, 11B, 11C:
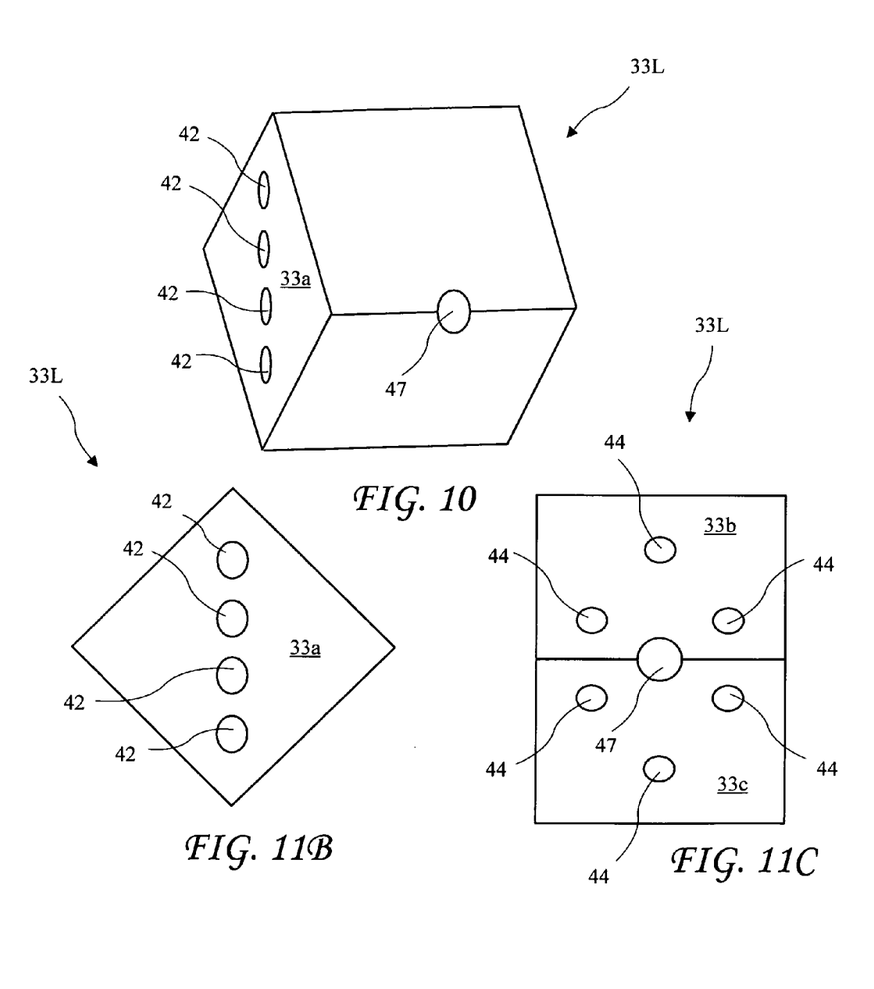
FIG. 10 is a front/side perspective view of a left safety light fixture.
FIG. 11B is a front view of the left safety light fixture.
FIG. 11C is a right side view of the left safety light fixture.
Figure 11A:
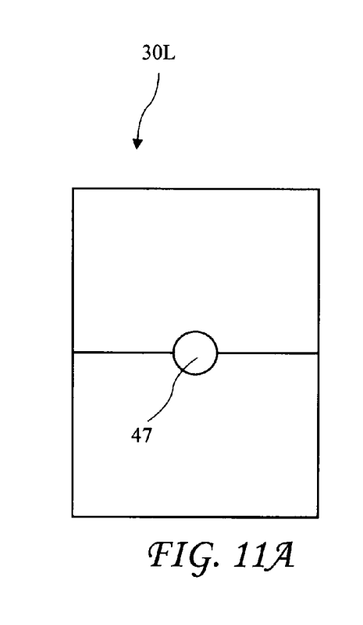
FIG. 11A is a left side view of the left safety light fixture.

A front/side perspective view of the left safety light fixture 33L is shown in FIG. 10, a left side view of the left safety light fixture 33L is shown in FIG. 11A, a front view of the left safety light fixture 33L is shown in FIG. 11B, and a right side view of the left safety light fixture 33L is shown in FIG. 11C. The left safety light fixture 33L has a forward facing surface 33a, an inward and upward facing surface 33b, and an inward and downward facing surface 33c. When the left safety light fixture 33L is attached to the bicycle 10, the forward facing surface 33a is aimed towards the rider's legs.

Preferably, at least two light sources 42 reside on the forward facing surface 33a and more preferably four light sources 42 reside on the forward facing surface 33a. The inward and upward facing surface 33b is preferably approximately orthogonal to the forward facing surface 33a and preferably reside approximately 45 degrees above the horizontal. The inward and downward facing surface 33c is preferably approximately orthogonal to the forward facing surface 33a and preferably resides approximately 45 degrees below the horizontal. Preferably, at least two light sources 42 reside on inward and upward facing surface 33b and on the inward and downward facing surface 33c, and more preferably, three light sources 42 in a triangular pattern reside on inward and upward facing surface 33b and on the inward and downward facing surface 33c. The left safety light fixture 33L preferably includes an attachment passage 47 for attaching to the bicycle 10. The attachment passage 47 preferably passes completely through the left safety light fixture 33L. The right safety light fixture 33R is preferably the mirror image of the left safety light fixture 33L along a vertical front to rear centerline.

Figure 12:
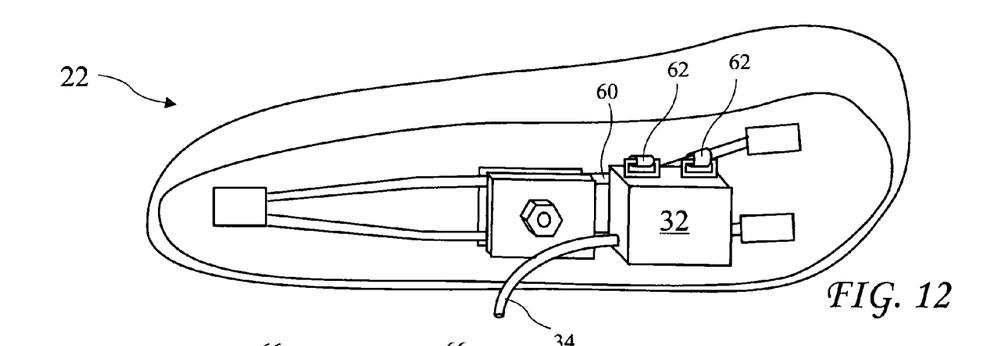
FIG. 12 is a bottom/side perspective view of a bicycle seat with a remote electrical power source mounted to the bottom of the seat.
Figure 13A:
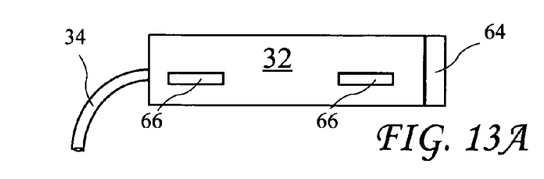
FIG. 13A is a side view of the remote electrical power source.
Figure 13B:
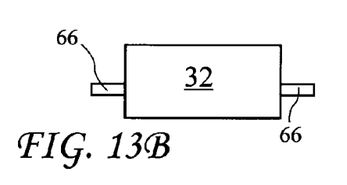
FIG. 13B is an end view of the remote electrical power source.
Figure 13C:
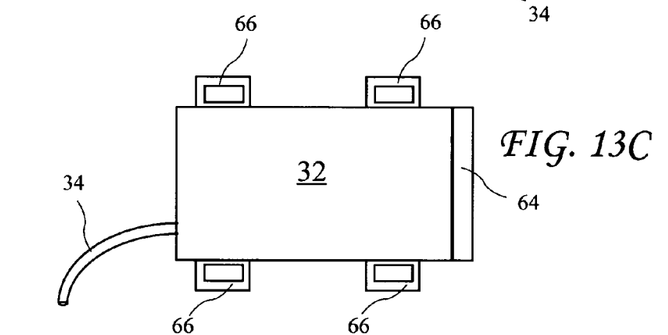
FIG. 13C is a top view of the remote electrical power source.

A bottom/side perspective view of the bicycle seat 22 with the remote electrical power source 32 mounted to the bottom of the seat 22 is shown in FIG. 12, a side view of the remote electrical power source 32 is shown in FIG. 13A, an end view of the remote electrical power source 32 is shown in FIG. 13B, and a top view of the remote electrical power source 32 is shown in FIG. 13C. The remote electrical power source 32 may contain typical household batteries, rechargeable batteries, may include a removable rechargeable module, or may include a receptacle for a recharger to recharge batteries inside the remote electrical power source 32. The remote electrical power source 32 further may include fastener features 66 for attaching the remote electrical power source 32 to the seat 22 using straps 62, for example, to seat rails 60. The remote electrical power source 32 may also be attached to the seat 22 using any suitable fastening means, or may alternatively be attached to the bicycle frame, or may be worn by the rider.

Figure 14:
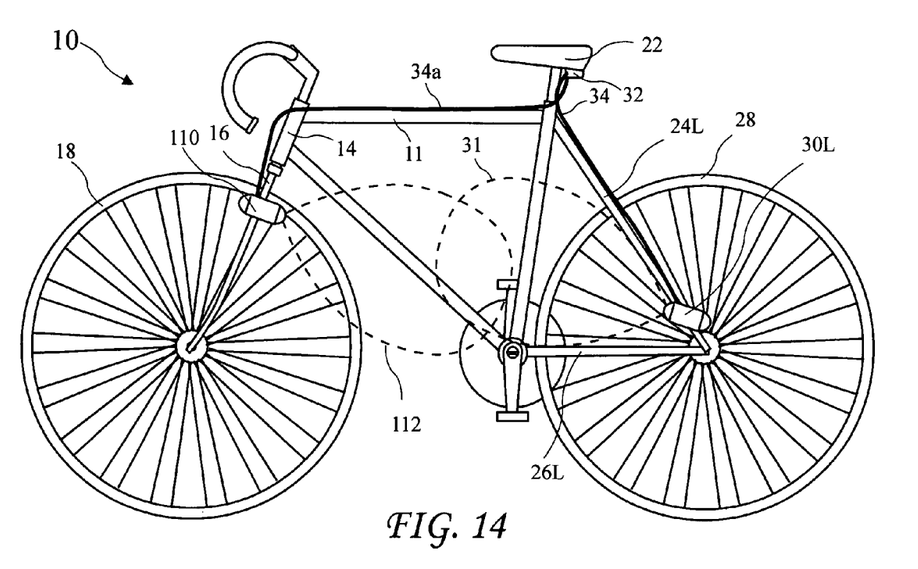
FIG. 14 is a side view of the bicycle and safety light system with rearward facing second safety light fixtures attached to a bicycle fork.
Figure 14A:
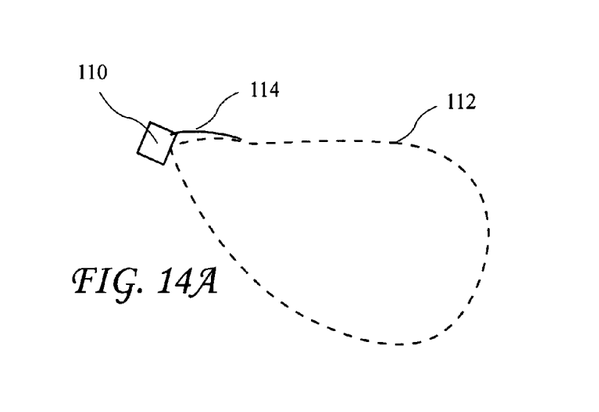
FIG. 14A is a side view of the rearward facing second safety light fixture and a shade.

A side view of the bicycle 10 and safety light system with rearward facing second safety light fixtures 110 attached ahead of the rider to a bicycle fork 16 is shown in FIG. 14 and a detailed view of the safety light fixture 110 with a shade 114 is shown in FIG. 14A. The second safety light fixtures 110 generate beams 112 pointing approximately rearward, to illuminate front surfaces of the rider's legs, with a shade 114 extending toward the rider mounted to the upper surface of the light fixture 110 to avoid blinding a rider who might look down. The rearward facing light fixture 110 may alternatively be mounted to the steering head 14 or the top tube 11.

While the safety lighting system has been presented as mounted to the bicycle 10, a safety lighting system according to the present invention is also suitable for mounting to a moped, or other vehicles, and any safety lighting system including substantially forward pointing safety light fixtures mounted below and behind the seat, and illuminating a rider's legs, is intended to come within the scope of the present invention.

Figure 15:
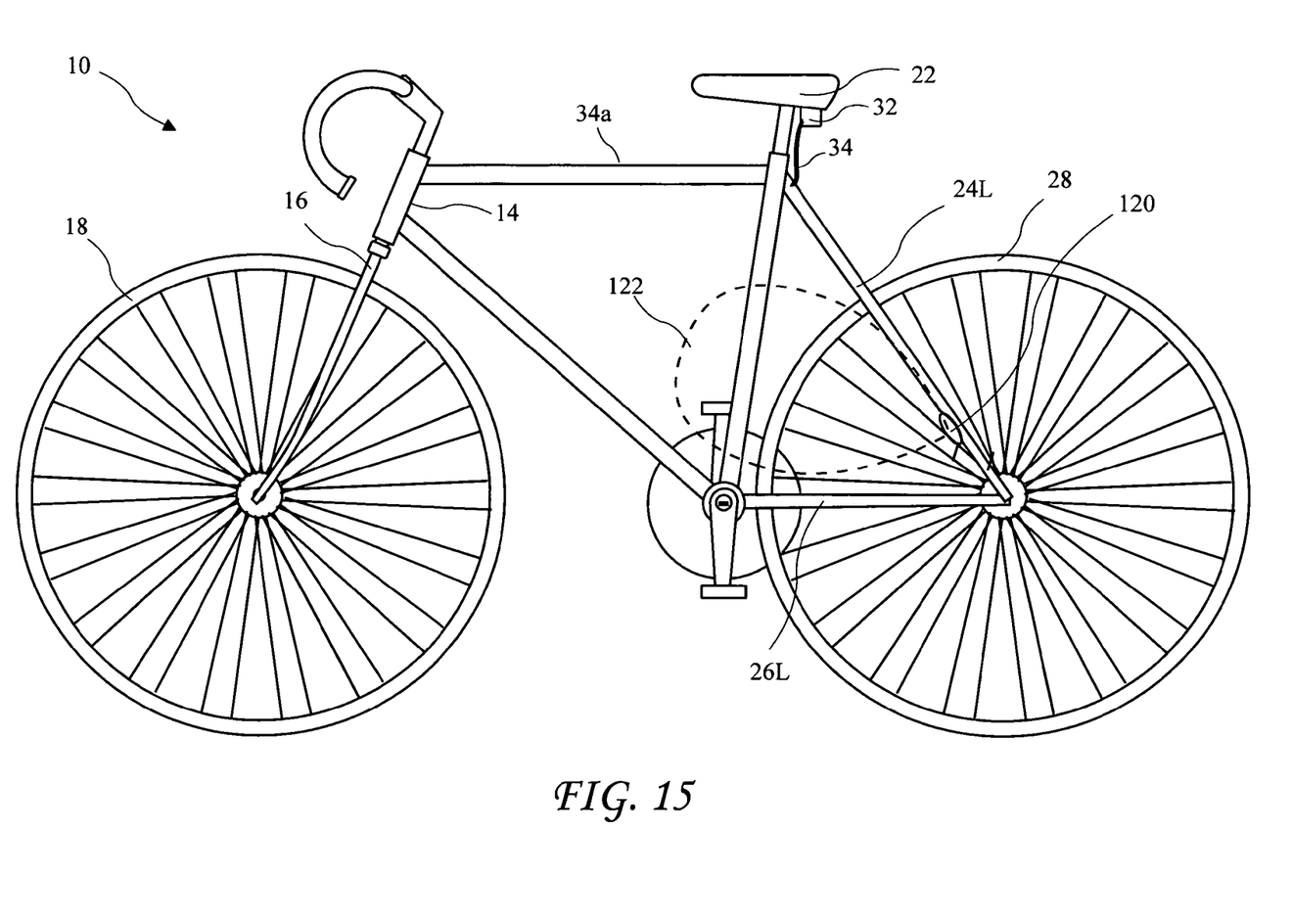
FIG. 15 is a bicycle with a safety light integrated into the frame.

A bicycle with a safety light 120 integrated into the frame is shown in FIG. 15.

While the invention herein disclosed has been described by means of specific embodiments and applications thereof, numerous modifications and variations could be made thereto by those skilled in the art without departing from the scope of the invention set forth in the claims.

I claim:

1. A bicycle and safety lighting system comprising;
    a bicycle including:
        a bicycle frame including a seat tube; and
        a bicycle seat supported by the seat tube;
    at least one safety light fixture mounted to the bicycle below and behind the seat;
    at least one light source element of the safety light fixture, the at least one light source generating a forward pointing beam aimed at a lower portion of a rider's legs; and
    an electrical power source providing electrical power to the at least one light source.

2. The bicycle and safety lighting system of claim 1, wherein;
    the bicycle frame further includes seat stays, and chain stays;
    the bicycle further includes a rear axle attached to the frame proximal to the intersection of the seat stays and the chain stays and a rear wheel and tire rotatably mounted to the rear axle; and
    the at least one safety light fixture is directly attached to one selected from the group consisting of the seat stays, the chain stays, and the rear axle.

3. The bicycle and safety lighting system of claim 2, wherein the at least one safety light fixture is mounted directly to one of the seat stays.

4. The bicycle and safety lighting system of claim 3, wherein the at least one safety light fixture is mounted to a lower portion of one of the seat stays.

5. The bicycle and safety lighting system of claim 4, wherein the at least one light source comprises at least one Light Emitting Diode (LED).

6. The bicycle and safety lighting system of claim 5, wherein the at least one LED comprises at least five LEDs on forward facing surfaces of each safety light fixture.

7. The bicycle and safety lighting system of claim 3, wherein the at least one safety light fixture comprises a right safety light fixture connected to the right seat stay and a left safety light fixture connected to the left seat stay.

8. The bicycle and safety lighting system of claim 3, wherein:
    the safety light fixture comprises a right safety light fixture and a left safety light fixture, the safety light fixtures including forward facing surfaces and inward facing surfaces;
    at least one LED resides on each forward facing surface of each safety light fixture for generating forward beams for illuminating the rider's legs;
    at least one LED resides on each inward facing surface of each safety light fixture for generating inward beams for illuminating the frame and the rear wheel; and
    the inward facing surfaces are approximately orthogonal to the forward facing surfaces.

9. The bicycle and safety lighting system of claim 8, wherein the inward facing surfaces face approximately 45 degrees above and below the horizontal.

10. The bicycle and safety lighting system of claim 1, wherein the power source resides inside the at least one safety light fixture.

11. The bicycle and safety lighting system of claim 1, wherein the power source is a remote power source attached to the seat and cabling electrically connects the remote power source to the at least one safety light fixture.

12. The bicycle and safety lighting system of claim 1, further including at least one second safety light fixture fixedly attached directly to an element selected from the group consisting of a bicycle fork, steering head, and top tube ahead of the rider and generating rearward beams pointing approximately rearward, and including a shade for blocking upwardly projecting light.

13. The bicycle and safety lighting system of claim 12, wherein the second safety light fixture is attached to a bicycle frame member selected from the group consisting of a steering head, a top tube, and a fork.

14. The bicycle and safety lighting system of claim 1, wherein all of the at least one light source element reside in a forward end of the at least safety light fixture for illuminating the rider's legs.

15. The bicycle and safety lighting system of claim 1, wherein the at least one safety light fixture includes the at least one light source element residing in a forward end of the safety light fixture and light source elements are absent from the rearward end of the safety light fixture.

16. A bicycle and safety lighting system comprising;
a bicycle comprising:
- a bicycle frame including a steering head, a top tube, a seat tube, a right seat stay, a left seat stay, a right chain stay, and a left chain stay;
- a fork rotatably connected to the steering head;
- a front wheel and tire rotatably mounted to the fork;
- a rear axle attached to the frame;
- a rear wheel and tire rotatably mounted to the rear axle;
- a bicycle seat supported by the seat tube;
a safety light fixture attached to one of the seat stays and including:
- at least one Light Emitting Diode (LED) generating a forward pointing beam aimed at lower legs of a rider.

17. The bicycle and safety lighting system of claim 16, further including at least one second safety light fixture mounted ahead of the rider and directing light towards the rider's legs.

18. A bicycle and safety lighting system comprising;
a bicycle comprising:
- a bicycle frame including a steering head, seat tube, a right seat stay, a left seat stay, a right chain stay, and a left chain stay;
- a fork rotatably connected to the steering head;
- a front wheel and tire rotatably mounted to the fork;
- a rear axle attached to the frame;
- a rear wheel and tire rotatably mounted to the frame proximal to the intersection of the seat stays and the chain stays;
- a bicycle seat supported by the seat tube;
a safety light fixture attached directly to a bicycle component selected from the group consisting of the left seat stay, the right seat stay, the left chain stay, the right chain stay, and the rear axle;
a light source element of the safety light fixture, the light source generating a forward pointing beam aimed at a lower portion of a rider's legs; and
a power source comprising batteries residing in the safety light fixture.

19. The bicycle and safety lighting system of claim 18, wherein the safety light fixture is attached to a lower portion of one of the seat stays.

20. The bicycle and safety lighting system of claim 18, wherein the safety light fixture is attached to a rear portion of one of the chain stays.

* * * * *